No. 801,228. PATENTED OCT. 10, 1905.
H. DUFFIN.
HOSE OR PIPE COUPLING.
APPLICATION FILED JULY 27, 1904.
3 SHEETS—SHEET 1.
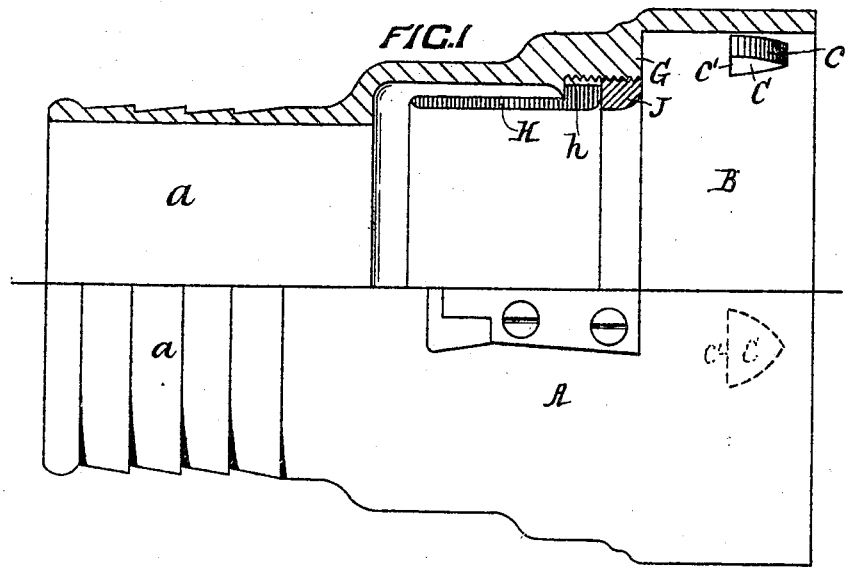
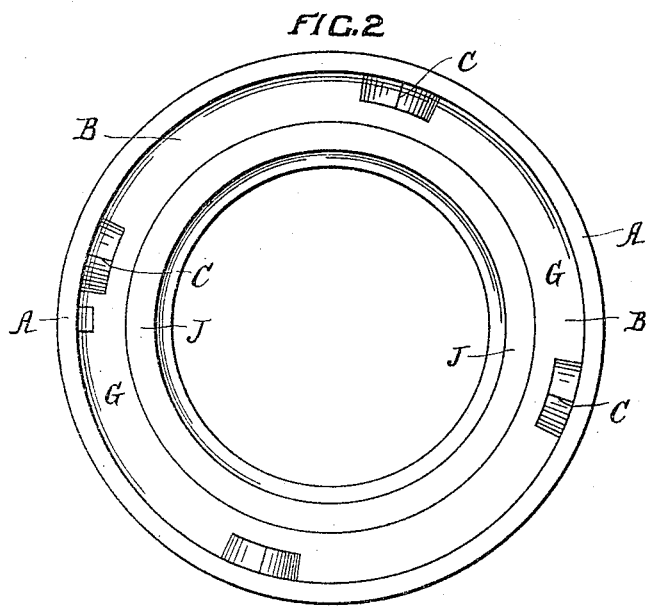
Attest:
C. S. Middleton
Edward F. Reed
Inventor.
Hugh Duffin
by Spear Middleton Donaldson & Spear
Attys

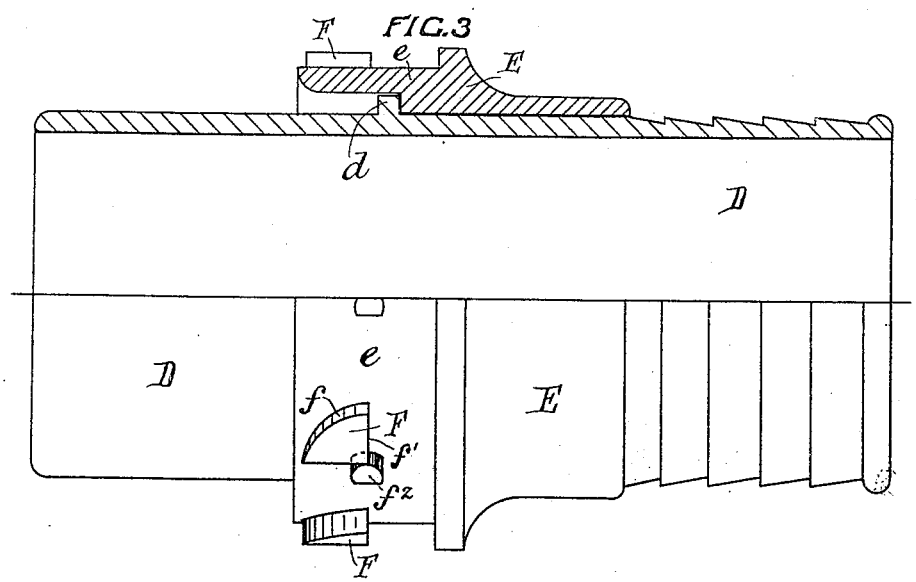
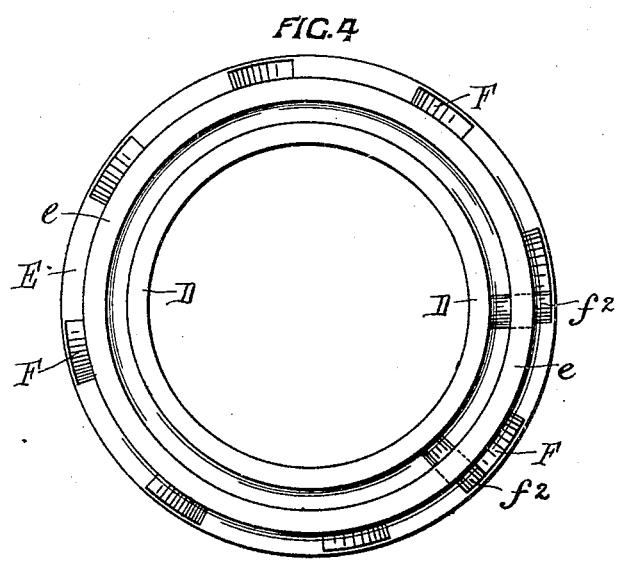

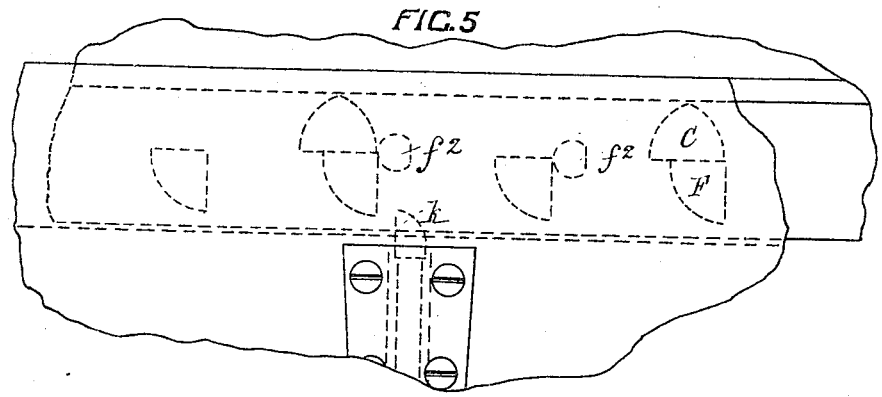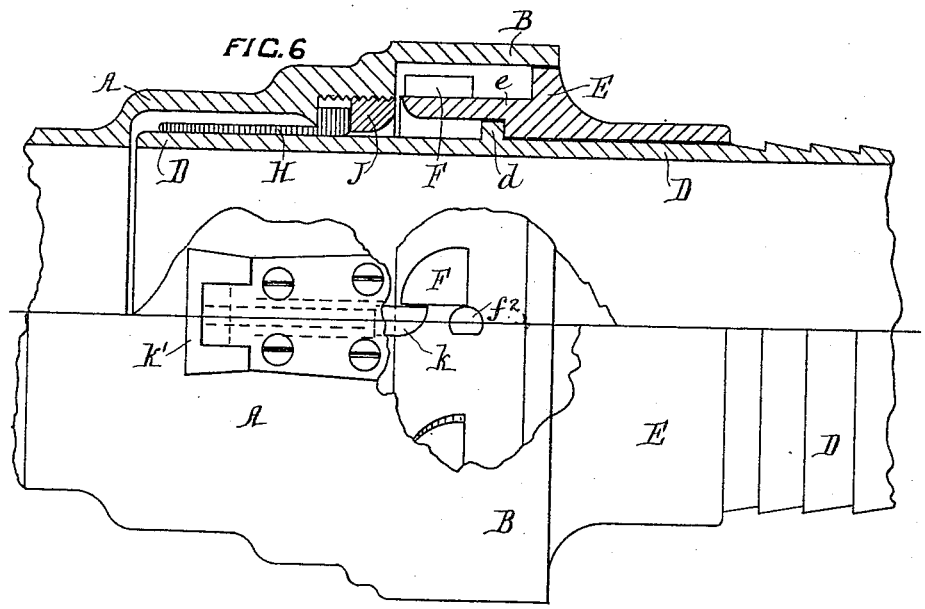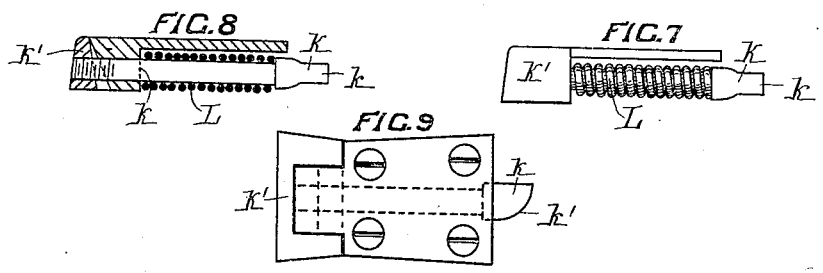

UNITED STATES PATENT OFFICE.

HUGH DUFFIN, OF AUCKLAND, NEW ZEALAND.

HOSE OR PIPE COUPLING.

No. 801,228. Specification of Letters Patent. Patented Oct. 10, 1905.

Application filed July 27, 1904. Serial No. 218,390.

*To all whom it may concern:*

Be it known that I, HUGH DUFFIN, a subject of the King of Great Britain, residing at Auckland, in the Colony of New Zealand, have invented a new and useful Improved Hose or Pipe Coupling; and I do hereby declare the following to be a full, clear, and exact description of the same.

This invention relates to means whereby two lengths of hose or piping of any description may be coupled together in an effective and expeditious manner and may be readily uncoupled.

The coupling is composed of two metal castings, to which the respective ends of the hosing are firmly attached. One of these castings is formed with a socket in its end provided with projecting teeth or stops on its inner periphery. The other casting is provided with a flange, and surrounding it is a collar that is adapted to enter the socket on the other casting. This collar is provided with teeth or stops on its outer periphery which are adapted to engage with those in the socket of the other casting when the collar is inserted into the socket and given a slight revolving movement, and thus connect both castings together.

Means are provided whereby the two castings may be locked together and also whereby a hermetically-tight joint may be obtained.

In the accompanying drawings, Figure 1 is a half side elevation and half sectional elevation of the socket or female piece. Fig. 2 is an end elevation of the same. Fig. 3 is a half side elevation and half sectional elevation of the plug or male portion of the coupling. Fig. 4 is an end elevation of the same. Fig. 5 is a diagram illustrating the manner in which the locking of the two portions together is obtained. Fig. 6 is a half side elevation and half sectional elevation of the two portions, shown connected together. Figs. 7, 8, and 9 are side elevation, sectional elevation, and plan, respectively, of the locking means employed.

A is a hollow metal casting, one end of which, $a$, is adapted to enter one end of the hosing to be connected together and to be secured therein. This casting is formed with an enlarged bell mouth or socket B on its other end, and upon the inner periphery thereof are formed the four projecting snugs or teeth C, which are each shaped with inclined faces $c$ toward the mouth of the socket B and with a square face $c'$ upon its back end.

D is a tubular metal casting, one end of which is adapted to be secured in the other end of the hosing to be connected. This casting is formed with a flange $d$ about midway in its length, and surrounding it is the collar E, that is formed with a portion $e$, that overhangs the flange $d$ and the shoulder of which engages with such flange. This portion $e$ is adapted to enter the socket B, and its outer periphery is provided with a number of snugs or teeth F, eight of which are shown in the drawings, Fig. 4. Each of these snugs is formed with an inclined front face $f$ and with a square face $f'$ on its back end. Stop-pieces $f^2$ are placed in juxtaposition to two of the snugs F, as shown in Figs. 3 and 6.

The socket B is provided with a shoulder G at a point a suitable distance behind the snugs C and is internally screw-threaded from the shoulder forward for a short distance. A sleeve H, of leather, rubber, or other suitable material, is formed with a collar $h$ at one end. This sleeve is inserted in the socket B, so that it shall extend inward, and is secured therein by having its collar $h$ held against the shoulder G of the socket by means of a ring J, screwed into the socket B. This ring and the sleeve are made of such a size as to permit of the free end of the pipe D passing freely through them into the socket.

In effecting the coupling the collar E has its portion $e$ inserted into the socket B, when by reason of its engagement with the flange $d$ of the casting D the end of such casting will also be passed into the socket through the ring J and the sleeve H. The collar is pushed right into the socket and given a partial revolution, when the square faces $f'$ of its snugs F will engage with the faces $c'$ of the snugs C of the socket. To insure of such engagement being effected, stop-pieces $f^2$ are provided, the edges of the snugs C engaging with one or other of such projections, so as to prevent the collar being turned too far round.

To disconnect the two portions A and D, it is then only necessary to give the collar a slight movement in the reverse direction, when the snugs C and F will become disengaged and the two parts may be drawn asunder. To prevent such being disconnected until desired, the catch shown in detail in Figs. 7, 8, and 9 is employed. The position of this catch is also shown clearly in Fig. 6, and it consists of a spring-controlled pin K, that is longitudinally mounted within a bearing formed in the top of the socket-casting B and the inner end of which projects into the socket, where it is provided with a catch $k$, formed with an inclined side face $k'$. The other end of the pin extends to the outside of the casting and is provided with a finger-piece $K'$, by means of which the pin may be drawn outward against the tendency of the spring L surrounding it. The tendency of the spring is to keep the catch pressed outward toward the mouth of the socket B. The catch $k$ is so arranged that its inclined face $k'$ shall engage with the inclined face $f$ of one of the snugs F as the collar E is revolved in the socket to make the connection. As the revolution continues the catch will be forced inward until the snug has passed it, when its spring will force it outward again, so that its square face shall engage with the straight side of the snug F. The collar E will thus be locked from movement in either direction by reason of one of its snugs being in engagement with the catch $k$ and one of its projections $f^2$ engaging with one of the snugs C of the socket B in the manner before described. To release the snug from the catch, it is only necessary to draw out the pin K the required distance, when the collar E may be turned in order to release it from the socket B. The sleeve H will closely surround the inner end of the pipe D, so that no leakage will be able to occur at the joint. It will thus be seen that a clear passage through the castings A and D will be obtained, so that the different lengths of hosing attached to them will be effectually connected.

What I claim as my invention, and desire to secure by Letters Patent, is—

1. In pipe-couplings, a hollow socket-piece formed with an enlarged recess on one end with tooth projections or snugs with inclined front faces upon the inner periphery of the recess in combination with a tubular piece formed with a flange between its ends, a collar loosely surrounding the tubular piece and overhanging the flange adapted to enter the recess in the socket-piece, and tooth projections or snugs formed with inclined front faces upon the outer periphery of the overhanging portion of the collar, substantially as herein specified.

2. In pipe-couplings, a hollow socket-piece formed with an enlarged recess on one end and with tooth projections or snugs upon the inner periphery of the recess, a spring-tooth projecting normally into the space inclosed within the recess and a rubber sleeve secured within the socket-piece, in combination with a tubular piece formed with a flange between its ends, a collar loosely surrounding the tubular piece and overhanging the flange, such overhanging portion being adapted to enter the recess in the socket-piece, and tooth projections or snugs upon the outer periphery of the overhanging portion which are adapted to engage with those upon the inner periphery of the recess and with the spring-tooth projecting therein, substantially as specified.

In testimony whereof I have signed this specification in the presence of two subscribing witnesses.

HUGH DUFFIN.

Witnesses:
E. BROOKE SMITH,
W. S. LAWSON.